(12) United States Patent
Hirau et al.

(10) Patent No.: US 8,608,593 B2
(45) Date of Patent: Dec. 17, 2013

(54) GOLF BALL

(75) Inventors: Tsutomu Hirau, Kobe (JP); Kazuhiko Isogawa, Kobe (JP)

(73) Assignee: SRI Sports Limited, Kobe (JP)

( * ) Notice: Subject to any disclaimer, the term of this patent is extended or adjusted under 35 U.S.C. 154(b) by 703 days.

(21) Appl. No.: 12/627,460

(22) Filed: Nov. 30, 2009

(65) Prior Publication Data
US 2010/0167846 A1 Jul. 1, 2010

(30) Foreign Application Priority Data
Dec. 29, 2008 (JP) .................... 2008-335603

(51) Int. Cl.
*A63B 37/00* (2006.01)
(52) U.S. Cl.
USPC .......................... 473/351; 473/409
(58) Field of Classification Search
USPC ................................. 473/351, 409
See application file for complete search history.

(56) References Cited

U.S. PATENT DOCUMENTS

| | | | |
|---|---|---|---|
| 6,089,847 A | 7/2000 | Inoue et al. | |
| 6,190,597 B1 * | 2/2001 | Inoue et al. | 264/275 |
| 6,235,230 B1 * | 5/2001 | Puniello | 264/278 |
| 6,238,194 B1 | 5/2001 | Inoue et al. | |
| 2006/0293121 A1 | 12/2006 | Egashira et al. | |
| 2008/0220904 A1 * | 9/2008 | Sullivan et al. | 473/376 |
| 2008/0227569 A1 | 9/2008 | Egashira et al. | |

FOREIGN PATENT DOCUMENTS

| | | |
|---|---|---|
| JP | 11-76466 A | 3/1999 |
| JP | 11-151323 A | 6/1999 |
| JP | 11-164914 A | 6/1999 |
| JP | 2005-230212 A | 9/2005 |
| JP | 3751824 B2 | 3/2006 |
| JP | 2007-622 A | 1/2007 |

* cited by examiner

*Primary Examiner* — Raeann Gorden
(74) *Attorney, Agent, or Firm* — Birch, Stewart, Kolasch & Birch, LLP (57) ABSTRACT

A golf ball 2 includes a core 4 and a cover 6 positioned outside the core 4. The cover 6 has a thickness of 0.2 mm or greater and 1.0 mm or less. The cover 6 is formed by injecting a resin composition from an injection molding machine into a mold. The product (M*V*T) of: a melt fluidity M (g/10 min) of the resin composition, which is measured at 190° C.; an injection rate V (cm³/sec) of the injection molding machine; and an injection time T (sec) of the injection molding machine, is equal to or greater than 500 and equal to or less than 1000. Preferably, in the golf ball 2, the melt fluidity M of the resin composition is equal to or greater than 15 g/10 min and equal to or less than 100 g/10 min.

17 Claims, 3 Drawing Sheets

GOLF BALL

This application claims priority on Patent Application No. 2008-335603 filed in JAPAN on Dec. 29, 2008. The entire contents of this Japanese Patent Application are hereby incorporated by reference.

BACKGROUND OF THE INVENTION

1. Field of the Invention

The present invention relates to golf balls. Specifically, the present invention relates to golf balls including a core and a cover.

2. Description of the Related Art

A general golf ball includes a core and a cover. For the cover, a resin composition including an ionomer resin or polyurethane as a principal component is used. A cover including ionomer resin has excellent resilience performance. On the other hand, a cover including polyurethane has excellent feel at impact, excellent controllability, and excellent scuff resistance.

Examples of methods for forming a cover include compression molding and injection molding. In compression molding, a core is covered with bowl-shaped half shells that are prepared in advance, and then compression-molded to form a cover. In injection molding, a melt resin is injected directly around a core with an injection molding machine, to form a cover. In light of productivity, injection molding is superior to compression molding.

JPH11-151323 (U.S. Pat. No. 6,190,597) discloses a golf ball including a thin spherical layer (corresponding to a cover) that is formed with uniform thickness by injection molding. The injection rate is optimized in injection molding, and the thin spherical layer is formed.

JP No. 3751824 (U.S. Pat. No. 6,235,230) discloses a mold for use in injection molding for forming a cover. The mold has a ring gate. The ring gate achieves balanced flow of a melt resin, thereby improving the durability of a golf ball.

In light of achieving a long flight distance, increasing the diameter of a core in order to cause a golf ball to fly at a high speed is studied. For increasing the diameter of the core, a cover needs to be thinner.

If an injection rate of an injection molding machine is insufficient when forming a thin cover, the cooling speed of an injected resin composition increases, and hence the resin composition may not be able to entirely cover the core. Even if the core is entirely covered with the resin composition, the hit durability of a golf ball may deteriorate because the strength of the golf ball at the weld line is insufficient. When only molding conditions such as temperature and pressure are controlled, a cover with sufficient characteristics cannot be obtained, and the life of the mold is also shortened.

When a flow improver such as oil is added to a resin composition for improving flow of the resin composition, there is a problem that characteristics such as resilience performance, durability, and appearance deteriorate. In injection molding that provides excellent productivity, it is difficult to achieve a thin cover without impairing the characteristics of the cover.

An objective of the present invention is to provide a golf ball that is manufactured by injection molding, has excellent durability, and achieves a long flight distance.

SUMMARY OF THE INVENTION

A golf ball according to the present invention comprises a core and a cover positioned outside the core. The cover has a thickness of 0.2 mm or greater and 1.0 mm or less. The cover is formed by injecting a resin composition from an injection molding machine into a mold. The product (M*V*T) of: a melt fluidity M (g/10 min of the resin composition), which is measured at 190° C.; an injection rate V ($cm^3$/sec) of the injection molding machine; and an injection time T (sec) of the injection molding machine, is equal to or greater than 500 and equal to or less than 1000.

Preferably, in the golf ball, the melt fluidity M of the resin composition is equal to or greater than 15 g/10 min and equal to or less than 100 g/10 min.

Preferably, in the golf ball, the resin composition includes a base polymer. The base polymer includes an ionomer resin and a carboxyl group-containing resin. The ionomer resin is the principal component of the base polymer. The carboxyl group-containing resin has a melt fluidity, measured at 190° C., of 100 g/10 min or greater.

Preferably, in the golf ball, the ionomer resin includes an $\alpha,\beta$-unsaturated carboxylic acid. The content of the $\alpha,\beta$-unsaturated carboxylic acid is equal to or greater than 2% by weight and equal to or less than 30% by weight.

Preferably, in the golf ball, the ionomer resin further includes a metal ion. A carboxyl group in the ionomer resin is neutralized with the metal ion. The degree of neutralization of the carboxyl groups with the metal ions is equal to or greater than 10 mol % and equal to or less than 90 mol %.

Preferably, in the golf ball, the ionomer resin further includes a monovalent metal ion. A carboxyl group in the ionomer resin is neutralized with the monovalent metal ion. The degree of neutralization of the carboxyl groups with the monovalent metal ions is equal to or greater than 10 mol % and equal to or less than 60 mol %.

Preferably, in the golf ball, the ionomer resin further includes a monovalent metal ion and a bivalent metal ion. The ratio of the content of the monovalent metal ion with respect to the content of the bivalent metal ion is equal to or greater than 0.1 and equal to or less than 60.

Preferably, in the golf ball, the ionomer resin has a melt viscosity, measured with a flow tester, of 500 Pa·sec or greater and 100000 Pa·sec or less.

Preferably, in the golf ball, the carboxyl group-containing resin includes a metal ion. Carboxyl groups in the carboxyl group-containing resin are neutralized with the metal ion. The degree of neutralization of the carboxyl groups with the metal ions is equal to or greater than 10 mol % and equal to or less than 100 mol %.

Preferably, in the golf ball, the carboxyl group-containing resin has a melt viscosity, measured with a Brookfield viscometer, of 1 Pa·sec or greater and 10 Pa·sec or less.

Preferably, in the golf ball, the weight ratio of the ionomer resin with respect to the carboxyl group-containing resin is equal to or greater than 55/45 and equal to or less than 99/1.

Preferably, in the golf ball, the ionomer resin includes a bivalent metal ion. The content of the bivalent metal ions included in 100 g of the base polymer is equal to or greater than 0.020 mol.

Preferably, in the golf ball, the injection rate V is equal to or greater than 250 $cm^3$/sec.

Preferably, in the golf ball, the mold consists of a pair of mold halves. The mold has a runner, a gate, and a cavity that are formed by the mold halves being mated. The mold is configured such that the resin composition discharged from the injection molding machine is led through the runner to the gate and injected from the gate into the cavity. The runner has a diameter of 1 mm or greater and 15 mm or less. The gate has a diameter of 0.2 mm or greater and 5 mm or less.

Preferably, in the golf ball, the mold further has a melt flipper. The melt flipper is provided in one of the mold halves constituting the mold. The runner is divided into two paths by the melt flipper. The melt flipper connects the paths. The mold includes an odd number of the melt flippers provided for the one cavity.

Preferably, in the golf ball, the cover has a flexural rigidity of 100 MPa or greater and 450 MPa or less.

Preferably, in the golf ball, the cover has a rebound resilience of 40% or greater.

Preferably, in the golf ball, the cover has a hardness, measured with a Shore D type spring hardness scale, of 40 or greater and 70 or less.

Preferably, in the golf ball, the injection time T is equal to or longer than 0.05 sec and equal to or shorter than 0.15 sec.

Preferably, a method for manufacturing the golf ball comprises the steps of:

(1) obtaining a core;
(2) preparing a mold having a cavity and placing the core into the cavity;
(3) discharging a resin composition from an injection molding machine; and
(4) injecting the discharged resin composition between the cavity and the core to form a cover with a thickness of 0.2 mm or greater and 1.0 mm or less.

The product (M*V*T) of: a melt fluidity M (g/10 min) of the resin composition, which is measured at 190° C.; an injection rate V ($cm^3$/sec) of the injection molding machine; and an injection time T (sec) of the injection molding machine, is equal to or greater than 500 and equal to or less than 1000.

In the golf ball according to the present invention, the cover is formed by injection molding. The golf ball has excellent productivity. The product (M*V*T) of: the melt fluidity M (g/10 min) of the resin composition, which is measured at 190° C.; the injection rate V ($cm^3$/sec) of the injection molding machine; and the injection time T (sec) of the injection molding machine is controlled in an appropriate range, and the cover is formed. In the golf ball, the thickness of the cover is uniform, and in addition, thin. The cover can contribute to increasing the diameter of the core. The golf ball has excellent resilience performance. The golf ball can achieve a long flight distance. The golf ball has sufficient strength at the weld line. Because the cover with sufficient characteristics is obtained, the golf ball has excellent durability. The golf ball is manufactured by injection molding, can have excellent durability, and can achieve a long flight distance.

DESCRIPTION OF THE PREFERRED EMBODIMENTS

The following will describe in detail the present invention based on preferred embodiments with reference to the accompanying drawings.

Figure 1:
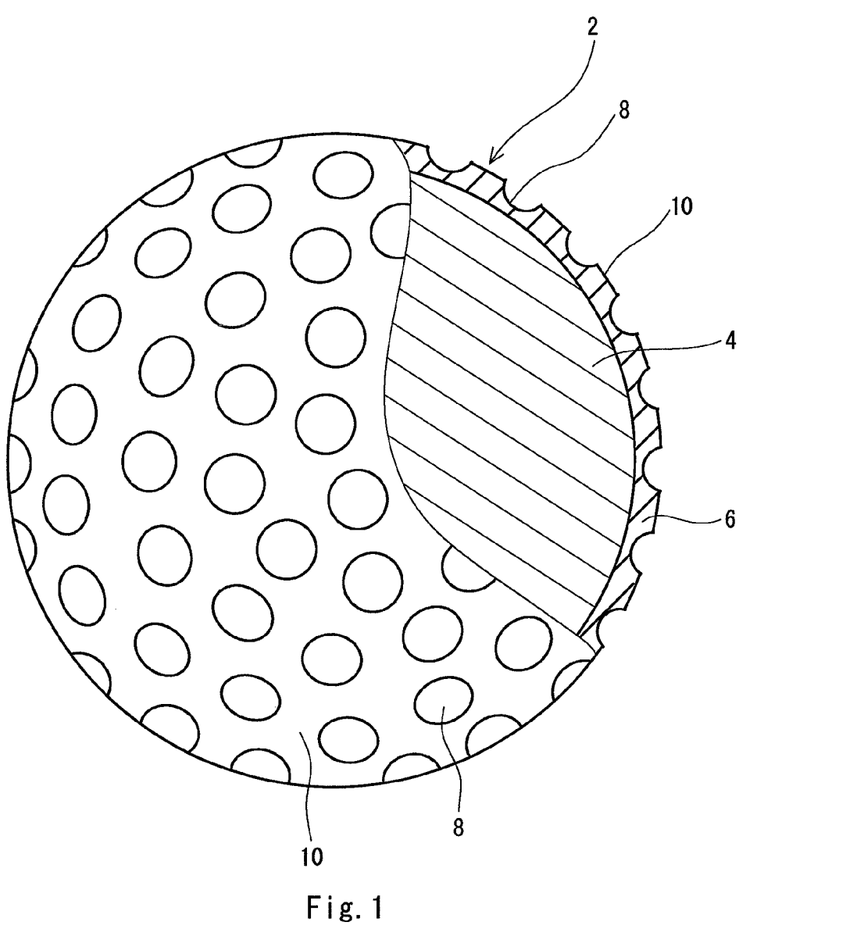
FIG. 1 is a schematic cross-sectional view of a golf ball according to an embodiment of the present invention.

Golf ball 2 shown in FIG. 1 includes a spherical core 4 and a cover 6 covering the core 4. The golf ball 2 has a large number of dimples 8 on its surface. Of the surface of the golf ball 2, a part other than the dimples 8 is a land 10. The golf ball 2 may further include a mid layer between the core 4 and the cover 6. The golf ball 2 may further include a paint layer covering the cover 6.

The golf ball 2 has a diameter of 40 mm or greater and 45 mm or less. From the standpoint of conformity to the rules established by the United States Golf Association (USGA), the diameter is more preferably equal to or greater than 42.67 mm. In light of suppression of air resistance, the diameter is more preferably equal to or less than 44 mm and particularly preferably equal to or less than 42.80 mm. The golf ball 2 has a weight of 40 g or greater and 50 g or less. In light of attainment of great inertia, the weight is more preferably equal to or greater than 44 g and particularly preferably equal to or greater than 45.00 g. From the standpoint of conformity to the rules established by the USGA, the weight is more preferably equal to or less than 45.93 g.

The core 4 is obtained by crosslinking a rubber composition. Examples of preferable base rubbers for use in the rubber composition include polybutadienes, polyisoprenes, styrene-butadiene copolymers, ethylene-propylene-diene copolymers, and natural rubbers. In light of resilience performance, polybutadienes are preferred. When another rubber is used in combination with a polybutadiene, it is preferred if the polybutadiene is included as a principal component. Specifically, the proportion of the polybutadiene to the entire base rubber is preferably equal to or greater than 50% by weight and particularly preferably equal to or greater than 80% by weight. The polybutadiene has a proportion of cis-1,4 bonds of preferably 40% or greater and particularly preferably 80% or greater.

In order to crosslink the core 4, a co-crosslinking agent is preferably used. Examples of preferable co-crosslinking agents in light of resilience performance include monovalent or bivalent metal salts of an $\alpha,\beta$-unsaturated carboxylic acid having 2 to 8 carbon atoms. Specific examples of preferable co-crosslinking agents include zinc acrylate, magnesium acrylate, zinc methacrylate, and magnesium methacrylate. Zinc acrylate and zinc methacrylate are particularly preferred on the grounds that high resilience performance can be achieved.

As the co-crosslinking agent, the $\alpha,\beta$-unsaturated carboxylic acid having 2 to 8 carbon atoms, and a metal oxide, may be also included. Both components react in the rubber composition and form a salt. This salt contributes to the crosslinking reaction. Examples of preferable $\alpha,\beta$-unsaturated carboxylic acids include acrylic acid and methacrylic acid. Examples of preferable metal oxides include zinc oxide and magnesium oxide.

In light of resilience performance of the golf ball 2, the amount of the co-crosslinking agent is preferably equal to or greater than 10 parts by weight and more preferably equal to or greater than 15 parts by weight, per 100 parts by weight of the base rubber. In light of soft feel at impact, the amount of the co-crosslinking agent is preferably equal to or less than 50 parts by weight and more preferably equal to or less than 45 parts by weight, per 100 parts by weight of the base rubber.

Preferably, the rubber composition of the core 4 includes an organic peroxide together with the co-crosslinking agent. The organic peroxide serves as a crosslinking initiator. The organic peroxide contributes to the resilience performance of the golf ball 2. Examples of suitable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide. An organic peroxide with particularly high versatility is dicumyl peroxide.

In light of resilience performance of the golf ball 2, the amount of the organic peroxide is preferably equal to or greater than 0.1 part by weight, more preferably equal to or greater than 0.3 part by weight, and particularly preferably equal to or greater than 0.5 part by weight, per 100 parts by weight of the base rubber. In light of soft feel at impact, the amount of the organic peroxide is preferably equal to or less than 3.0 parts by weight, more preferably equal to or less than 2.8 parts by weight, and particularly preferably equal to or less than 2.5 parts by weight, per 100 parts by weight of the base rubber.

Preferably, the rubber composition of the core 4 includes an organic sulfur compound. Examples of preferable organic sulfur compounds include monosubstitutions such as diphenyl disulfide, bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide, bis(4-cyanophenyl)disulfide, and the like; disubstitutions such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl) disulfide, bis(2-cyano-5-bromophenyl)disulfide, and the like; trisubstitutions such as bis(2,4,6-trichlorophenyl)disulfide, bis(2-cyano-4-chloro-6-bromophenyl)disulfide, and the like; tetrasubstitutions such as bis(2,3,5,6-tetrachlorophenyl)disulfide and the like; and pentasubstitutions such as bis(2,3,4,5,6-pentachlorophenyl)disulfide, bis(2,3,4,5,6-pentabromophenyl)disulfide, and the like. The organic sulfur compound contributes to resilience performance. Particularly preferable organic sulfur compounds are diphenyl disulfide and bis(pentabromophenyl)disulfide.

In light of resilience performance of the golf ball 2, the amount of the organic sulfur compound is preferably equal to or greater than 0.1 part by weight and more preferably equal to or greater than 0.2 part by weight, per 100 parts by weight of the base rubber. In light of soft feel at impact, the amount of the organic sulfur compound is preferably equal to or less than 1.5 parts by weight, more preferably equal to or less than 1.0 part by weight, and particularly preferably equal to or less than 0.8 part by weight, per 100 parts by weight of the base rubber.

For the purpose of adjusting specific gravity and the like, a filler may be included in the core 4. Examples of suitable fillers include zinc oxide, barium sulfate, calcium carbonate, and magnesium carbonate. Powder of a metal with a high specific gravity may be included as a filler. Specific examples of metals with a high specific gravity include tungsten and molybdenum. The amount of the filler is determined as appropriate so that the intended specific gravity of the core 4 is accomplished. A particularly preferable filler is zinc oxide. Zinc oxide serves not only as a specific gravity adjuster but also as a crosslinking activator. According to need, various additives such as sulfur, a sulfur compound, an anti-aging agent, a coloring agent, a plasticizer, a dispersant, and the like are included in the core 4 in an adequate amount. Crosslinked rubber powder or synthetic resin powder may be also included in the core 4.

The core 4 has an amount of compressive deformation of preferably 2.4 mm or greater and 3.8 mm or less. The core 4 with an amount of compressive deformation of 2.4 mm or greater contributes to soft feel at impact. In this respect, the amount of compressive deformation is more preferably equal to or greater than 2.6 mm and particularly preferably equal to or greater than 2.8 mm. The core 4 with an amount of compressive deformation of 3.8 mm or less contributes to the resilience performance and the durability of the golf ball 2. In this respect, the amount of compressive deformation is more preferably equal to or less than 3.6 mm and particularly preferably equal to or less than 3.4 mm.

Upon measurement of the amount of compressive deformation, first, a sphere (i.e. the core 4 or the golf ball 2) is placed on a hard plate made of metal. Next, a cylinder made of metal gradually descends toward the sphere. The sphere, squeezed between the bottom face of the cylinder and the hard plate, becomes deformed. A migration distance of the cylinder, starting from the state in which an initial load of 98 N is applied to the sphere up to the state in which a final load of 1274 N is applied thereto, is the amount of compressive deformation.

The core 4 has a surface hardness of preferably 40 or greater and 60 or less. The core 4 with a hardness of 40 or greater contributes to resilience performance. In this respect, the hardness is more preferably equal to or greater than 45. The core 4 with a hardness of 60 or less contributes to feel at impact. In this respect, the hardness is more preferably equal to or less than 55. The hardness is measured by pressing a Shore D type spring hardness scale mounted to an automated rubber hardness measurement machine (trade name "P1", available from Kobunshi Keiki Co., Ltd.), against the surface of the core 4.

The temperature for crosslinking the core 4 is generally equal to or higher than 140° C. and equal to or lower than 180° C. The time period for crosslinking the core 4 is generally equal to or longer than 10 minutes and equal to or shorter than 60 minutes. The core 4 may be formed with two or more layers. The core 4 may have a rib on the surface thereof. The diameter of the core 4 is determined such that the later-described thickness of the cover 6 can be achieved.

The cover 6 is positioned outside the core 4. The cover 6 has a thickness of 0.2 mm or greater and 1.0 mm or less. The cover 6 is thin. The cover 6 can contribute to increasing the diameter of the core 4. The golf ball 2 has excellent resilience performance. The golf ball 2 flies at a high speed. The golf ball 2 can achieve a long flight distance.

The cover 6 is formed from a resin composition. The resin composition includes a base polymer. Examples of the base polymer include ionomer resins, styrene block-containing thermoplastic elastomers, thermoplastic polyester elastomers, thermoplastic polyamide elastomers, and thermoplastic polyolefin elastomers.

Particularly preferable base polymers are ionomer resins. Ionomer resins are highly elastic. The golf ball 2 with the cover 6 including an ionomer resin has excellent resilience performance. An ionomer resin and another resin may be used in combination. In this case, in light of resilience performance, the principal component of the base polymer is preferably the ionomer resin. The proportion of the ionomer resin to the entire base polymer is preferably equal to or greater than 30% by weight, more preferably equal to or greater than 40% by weight, and particularly preferably equal to or greater than 45% by weight.

An example of a preferable ionomer resin is a binary copolymer formed with ethylene and an $\alpha,\beta$-unsaturated carboxylic acid having 3 to 8 carbon atoms. The binary copolymer has excellent resilience performance. An example of another preferable ionomer resin is a ternary copolymer formed with: ethylene; an $\alpha,\beta$-unsaturated carboxylic acid having 3 to 8 carbon atoms; and an $\alpha,\beta$-unsaturated carboxylate ester having 2 to 22 carbon atoms. The ternary copolymer has excellent resilience performance. The binary copolymer and the ternary copolymer may be used in combination.

Examples of preferable $\alpha,\beta$-unsaturated carboxylic acids for the ionomer resin include acrylic acid, methacrylic acid, fumaric acid, maleic acid, and crotonic acid. In light of resilience performance, acrylic acid and methacrylic acid are preferred.

The content of the α,β-unsaturated carboxylic acid included in the ionomer resin is preferably equal to or greater than 2% by weight and more preferably equal to or greater than 3% by weight. The content is preferably equal to or less than 30% by weight and more preferably equal to or less than 25% by weight.

Examples of preferable α,β-unsaturated carboxylic acid esters for the ionomer resin include methyl esters, ethyl esters, propyl esters, n-butyl esters, and isobutyl esters of acrylic acid, methacrylic acid, fumaric acid, and maleic acid. In light of resilience performance, acrylic acid esters and methacrylic acid esters are preferred.

In each of the binary copolymer and the ternary copolymer, some of carboxyl groups are neutralized with metal ions. Examples of metal ions for neutralization include monovalent metal ions such as sodium ion, potassium ion, and lithium ion; bivalent metal ions such as magnesium ion, calcium ion, zinc ion, barium ion, and cadmium ion; trivalent metal ions such as aluminum ion; and other ions such as zirconium ion. Examples of preferable metal ions in light of resilience performance include sodium ion, zinc ion, lithium ion, and magnesium ion.

The degree of neutralization of the carboxyl groups in the ionomer resin with metal ions is preferably equal to or greater than 10 mol %, more preferably equal to or greater than 15 mol %, and particularly preferably equal to or greater than 20 mol %. The degree of neutralization is preferably equal to or less than 90 mol % and particularly preferably equal to or less than 85 mol %. In the present specification, the degree of neutralization is the proportion of the number of moles of neutralized carboxyl groups to the total number of moles of carboxyl groups.

From the standpoint that the flowability of the resin composition and the rigidity and the resilience performance of the cover 6 are well-balanced, the degree of neutralization of the carboxyl groups in the ionomer resin with monovalent metal ions is preferably equal to or greater than 10 mol %, more preferably equal to or greater than 15 mol %, and particularly preferably equal to or greater than 20 mol %. The degree of neutralization is preferably equal to or less than 60 mol % and more preferably equal to or less than 50 mol %.

In light of resilience performance, the neutralization is preferably carried out with two or more types of metal ions. The ionomer resin in which some of carboxyl groups within the molecular chains are neutralized with two or more types of metal ions is referred to as a dual-ion ionomer resin. When the neutralization is carried out with two or more types of metal ions, a monovalent metal ion and a bivalent metal ion are preferably used in combination in light of resilience performance. In this case, examples of preferable monovalent metal ions include sodium ion and lithium ion. Sodium ion and lithium ion may be used in combination. Examples of preferable bivalent metal ions include magnesium ion and zinc ion. Magnesium ion and zinc ion may be used in combination.

When the carboxyl groups in the ionomer resin are neutralized with monovalent metal ions and bivalent metal ions, from the standpoint that the flowability of the resin composition and the rigidity and the resilience performance of the cover 6 are well-balanced, the ratio (M1/M2) of the content M1 (mol) of the monovalent metal ion with respect to the content M2 (mol) of the bivalent metal ion is preferably equal to or greater than 0.1, more preferably equal to or greater than 0.2, and even more preferably equal to or greater than 0.3. The ratio (M1/M2) is preferably equal to or less than 60, more preferably equal to or less than 50, and even more preferably equal to or less than 40.

From the standpoint that the flowability of the resin composition and the rigidity and the resilience performance of the cover 6 are well-balanced, an ionomer resin, in which the degree of neutralization with monovalent metal ions is equal to or greater than 10 mol % and equal to or less than 60 mol % and the ratio (M1/M2) is equal to or greater than 0.1 and equal to or less than 60, is preferred. Such an ionomer resin is preferably obtained by blending an ionomer resin, as a starting material, whose degree of neutralization with monovalent metal ions is adjusted so as to be equal to or greater than 10 mol % and equal to or less than 60 mol %, with basic zinc carbonate, zinc acetate, zinc oxide, and magnesium hydroxide in a melting state.

From the standpoint that the cover 6 which can contribute to achieving a long flight distance of the golf ball 2 is obtained, an ionomer resin with a high melt viscosity is preferred. This ionomer resin preferably has a melt viscosity, measured with a flow tester, of 500 Pa·sec or greater and 100000 Pa·sec or less. The cover 6 formed from a resin composition including an ionomer resin with a melt viscosity of 500 Pa·sec or greater can contribute to the durability of the golf ball 2. In this respect, the melt viscosity is more preferably equal to or greater than 1000 Pa·sec and particularly preferably equal to or greater than 1500 Pa·sec. An ionomer resin with a melt viscosity of 100000 Pa·sec or less can contribute to the moldability of the cover 6. In this respect, the melt viscosity is more preferably equal to or less than 95000 Pa·sec and particularly preferably equal to or less than 92000 Pa·sec.

In the present invention, for the melt viscosity measured with the flow tester, the melt viscosity of a pellet-form sample is measured with a flow characteristics evaluation apparatus (Flow Tester CFT-500D, manufactured by SHIMADZU CORPORATION) under the following conditions.

Measurement Conditions
DIE LENGTH: 1 mm
DIE DIA: 1 mm
Load: 294 N
Temperature: 190° C.

Specific examples of an ionomer resin (A) with a high melt viscosity include trade names "Himilan 1555", "Himilan 1557", "Himilan 1605", "Himilan 1706", "Himilan 1707", "Himilan 1856", "Himilan 1855", "Himilan AM7311", "Himilan AM7315", "Himilan AM7317", "Himilan AM7318", "Himilan AM7329", "Himilan MK7320", and "Himilan MK7329", available from Du Pont-MITSUI POLYCHEMICALS Co., Ltd.; trade names "Surlyn 6120", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "HPF1000", and "HPF2000", available from E.I. du Pont de Nemours and Company; and trade names "IOTEK 7010", "IOTEK 7030", "IOTEK 7510", "IOTEK 7520", "IOTEK 8000", and "IOTEK 8030", available from ExxonMobil Chemical Corporation.

As described above, the base polymer of the resin composition can further include another resin. When the principal component of the base polymer is the ionomer resin (A), in light of ease of blending with the ionomer resin (A), the other resin is preferably a carboxyl group-containing resin. Further, in light of improvement of the flowability of the resin composition, the carboxyl group-containing resin more preferably has high flowability.

In light of effective contribution to improvement of the flowability of the resin composition, the carboxyl group-containing resin has a melt fluidity of preferably 100 g/10 min or greater, more preferably 150 g/10 min or greater, and particularly preferably 180 g/10 min or greater. The melt fluidity of the carboxyl group-containing resin is preferably equal to or less than 1500 g/10 min, more preferably equal to or less than 1200 g/10 min, and particularly preferably equal to or less than 1000 g/10 min.

In the present invention, the melt fluidity is measured with "SHIMADZU Flow Tester CFT-100C", manufactured by SHIMADZU CORPORATION, according to JIS K 7210 under the following conditions. The melt fluidity is also referred to as melt flow rate (MFR).

Measurement Conditions
Measurement Temperature: 190° C.
Load: 2.16 kg

An example of the carboxyl group-containing resin is an ionomer resin (B) with a low melt viscosity. An example of a preferable ionomer resin (B) is a binary copolymer formed with ethylene and an α,β-unsaturated carboxylic acid. The binary copolymer has excellent resilience performance. An example of another preferable ionomer resin (B) is a ternary copolymer formed with ethylene, an α,β-unsaturated carboxylic acid, and an α,β-unsaturated carboxylic acid ester. The ternary copolymer has excellent resilience performance. The binary copolymer and the ternary copolymer may be used in combination.

The content of the α,β-unsaturated carboxylic acid included in the ionomer resin (B) is preferably equal to or greater than 2% by weight and more preferably equal to or greater than 3% by weight. The content is preferably equal to or less than 30% by weight and more preferably equal to or less than 25% by weight. Examples of a preferable α,β-unsaturated carboxylic acid included in the ionomer resin (B) include acrylic acid, methacrylic acid, fumaric acid, maleic acid, and crotonic acid. In light of resilience performance, acrylic acid and methacrylic acid are preferred.

In the ionomer resin (B), in each of the binary copolymer and the ternary copolymer, some of carboxyl groups are neutralized with metal ions. Examples of metal ions for neutralization include monovalent metal ions such as sodium ion, potassium ion, and lithium ion; bivalent metal ions such as magnesium ion, calcium ion, zinc ion, barium ion, and cadmium ion; trivalent metal ions such as aluminum ion; and other ions such as zirconium ion. In light of contribution to the flowability of the resin composition, bivalent metal ions are preferred.

In light of effective improvement of the flowability of the resin composition, the degree of neutralization of the carboxyl groups in the ionomer resin (B) with metal ions is preferably equal to or greater than 10 mol %, more preferably equal to or greater than 15 mol %, and particularly preferably equal to or greater than 20 mol %. Most preferably, the degree of neutralization is equal to or less than 100 mol %.

The ionomer resin (B) preferably has a melt viscosity, measured with a Brookfield viscometer, of 1 Pa·sec or greater and 10 Pa·sec or less. Setting the melt viscosity to be equal to or greater than 1 Pa·sec makes it possible to easily blend the ionomer resin (B) with the ionomer resin (A). The cover 6 formed from a resin composition including the ionomer resin (B) can contribute to improvement of the durability of the golf ball 2. In this respect, the melt viscosity is more preferably equal to or greater than 2 Pa·sec and particularly preferably equal to or greater than 3 Pa·sec. Setting the melt viscosity to be equal to or less than 10 Pa·sec effectively improves the flowability of the resin composition. In this respect, the melt viscosity is more preferably equal to or less than 9 Pa·sec and particularly preferably equal to or less than 8 Pa·sec.

In the present invention, for the melt viscosity measured with the Brookfield viscometer, the ionomer resin (B) is heated to 190° C. and the melt viscosity thereof is measured with a Brookfield viscometer (BL viscometer, manufactured by TOKYO KEIKI INC.). For the measurement, a rotor No. 4 is used, and the rotational speed is 6 rpm.

When the ionomer resin (B) is used in combination with the ionomer resin (A), in light of excellent flowability and contribution to forming a thin cover 6, the weight ratio of the ionomer resin (A) with respect to the ionomer resin (B) is preferably equal to or greater than 55/45 and equal to or less than 99/1. The weight ratio is more preferably equal to or greater than 58/42 and particularly preferably equal to or greater than 60/40. The weight ratio is more preferably equal to or less than 90/10 and particularly preferably equal to or less than 85/15.

Specific examples of the ionomer resin (B) include trade names "Aclyn 201 (Ca)", "Aclyn 246 (Mg)", and "Aclyn 295 (Zn)", available from Honeywell international Inc.

In light of improvement of the flowability of the resin composition, a thermoplastic resin (C) that has high flowability and in which acid component such as carboxyl group is not neutralized with metal ion may be used as the carboxyl group-containing resin. The thermoplastic resin (C) preferably has a melt viscosity, measured with a flow tester, of 5 Pa·sec or greater and 3000 Pa·sec or less.

The thermoplastic resin (C) preferably has a melt viscosity, measured with a Brookfield viscometer, of 5 Pa·sec or greater and 3000 Pa·sec or less. By setting the melt viscosity to be equal to or greater than 5 Pa·sec, the golf ball 2 with excellent durability is obtained. In this respect, the melt viscosity is more preferably equal to or greater than 10 Pa·sec and particularly preferably equal to or greater than 15 Pa·sec. By setting the melt viscosity to be equal to or less than 3000 Pa·sec, the thermoplastic resin (C) can contribute to the flowability of the resin composition. In this respect, the melt viscosity is more preferably equal to or less than 2800 Pa·sec and particularly preferably equal to or less than 2600 Pa·sec.

Examples of the thermoplastic resin (C) include thermoplastic polyamide elastomers, ethylene-methacrylic acid copolymers, ethylene-acrylic acid copolymers, thermoplastic polyester elastomers, thermoplastic polystyrene elastomers, thermoplastic polyester elastomers, and thermoplastic polyurethane elastomers. A specific example of the thermoplastic polyamide elastomers is trade name "PEBAX 2533" available from Arkema Inc. Specific examples of the ethylene-methacrylic acid copolymers include trade names "NUCREL N1050H", "NUCREL N2050H", "NUCREL N1110H", and "NUCREL N0200H", available from Du Pont-MITSUI POLYCHEMICALS Co., Ltd. A specific example of the ethylene-acrylic acid copolymers is trade name "PRIMACOR 59901" available from Du Pont-MITSUI POLYCHEMICALS Co., Ltd. Specific examples of the thermoplastic polyester elastomers include trade names "Hytrel 3548" and "Hytrel 4047" available from Du Pont-Toray Co., Ltd. A specific example of the thermoplastic polystyrene elastomers is trade name "Rabalon" available from Mitsubishi Chemical Corporation. A specific example of the thermoplastic polyester elastomers is trade name "Primalloy" available from Mitsubishi Chemical Corporation. A specific example of the thermoplastic polyurethane elastomers is trade name "Elastollan ET880" available from BASF polyurethane elastomers Ltd.

In the golf ball 2, the base polymer of the resin composition may consist of the ionomer resin (A) and the ionomer resin (B). The base polymer may consist of the ionomer resin (A) and the thermoplastic resin (C). The base polymer may consist of the ionomer resin (A), the ionomer resin (B), and the nonionic thermoplastic resin (C). The composition of the base polymer is determined as appropriate in view of the specifications of the golf ball 2, and the like.

When the base polymer of the resin composition consists of the ionomer resin (A), the ionomer resin (B), and the nonionic thermoplastic resin (C), the proportion of the ionomer resin (A) to the base polymer is preferably equal to or greater than 55% by weight and equal to or less than 70% by weight. The proportion of the ionomer resin (B) to the base polymer is preferably equal to or greater than 5% by weight and equal to or less than 10% by weight. The proportion of the nonionic thermoplastic resin (C) to the base polymer is preferably equal to or greater than 10% by weight and equal to or less than 40% by weight. In the golf ball 2, the proportion of the ionomer resin (A) to the base polymer is more preferably equal to or greater than 52% by weight and equal to or less than 68% by weight. The proportion of the ionomer resin (B) to the base polymer is more preferably equal to or greater than 6% by weight and equal to or less than 18% by weight. The proportion of the nonionic thermoplastic resin (C) to the base polymer is more preferably equal to or greater than 11% by weight and equal to or less than 35% by weight.

In the golf ball 2, in addition to the base polymer, a coloring agent such as titanium dioxide, a filler such as barium sulfate, a dispersant, an antioxidant, an ultraviolet absorber, a light stabilizer, a fluorescent material, a fluorescent brightener, and the like are included in the resin composition in an adequate amount according to need.

From the standpoint that the resultant golf ball 2 has an outer-hard/inner-soft structure and a flight distance is increased, the cover 6 has a flexural rigidity of preferably 100 MPa or greater, more preferably 110 MPa or greater, and even more preferably 120 MPa or greater. From the standpoint that the cover 6 becomes moderately flexible and the golf ball 2 has excellent feel at impact, the flexural rigidity is preferably equal to or less than 450 MPa, more preferably equal to or less than 420 MPa, and even more preferably equal to or less than 400 MPa.

The flexural rigidity of the cover 6 is measured according to the standards of "JIS K 7106". For the measurement, a slab formed by hot press and having a thickness of about 2 mm is used. A slab maintained at 23° C. for two weeks is used for the measurement. The measurement is conducted under the conditions of: a temperature of 23° C.; and a humidity of 50% RH.

From the standpoint that the resultant golf ball 2 has a long flight distance, the cover 6 has a rebound resilience of preferably 40% or greater, more preferably 41% or greater, and even more preferably 42% or greater.

The rebound resilience of the cover 6 is obtained by a Lupke rebound resilience test (test temperature: 23° C., test humidity: 50% RH) according to "JIS K 6255". For the measurement, a disc-shaped slab formed by hot press and having a thickness of about 2 mm and a diameter of 28 mm is used. A disc-shaped slab maintained at 23° C. for two weeks is used for the measurement. At the measurement, six slabs are stacked. A slab formed from the same resin composition as the resin composition of the cover 6 is used for the measurement.

From the standpoint that the rigidity of the resultant cover 6 increases and the golf ball 2 with excellent resilience (flight distance) is obtained, the cover 6 has a hardness of preferably 40 or greater, more preferably 45 or greater, and even more preferably 50 or greater. In light of further improvement of durability, the hardness of the cover 6 is preferably equal to or less than 70, more preferably equal to or less than 68, and even more preferably equal to or less than 65.

The hardness of the cover 6 is measured according to the standards of "ASTM-D 2240-68" with a Shore D type spring hardness scale mounted to an automated rubber hardness measurement machine (trade name "P1", available from Koubunshi Keiki Co., Ltd.). For the measurement, a slab formed by hot press and having a thickness of about 2 mm is used. A slab maintained at 23° C. for two weeks is used for the measurement. At the measurement, three slabs are stacked. A slab formed from the same resin composition as the resin composition of the cover 6 is used for the measurement.

In the golf ball 2, in light of improvement of durability and low-temperature durability, the cover 6 preferably include a bivalent metal ion such as calcium ion, magnesium ion, zinc ion. A particularly preferably metal ion is zinc ion.

In the golf ball 2, the content of the bivalent metal ion included in 100 g of the base polymer is preferably equal to or greater than 0.020 mol. The content is more preferably equal to or greater than 0.025 mol, even more preferably equal to or greater than 0.030 mol, and particularly preferably equal to or greater than 0.033 mol. From the standpoint that the flowability of the resin composition and the resilience performance of the cover 6 are maintained appropriately, the content is preferably equal to or less than 0.16 mol, more preferably equal to or less than 0.15 mol, and particularly preferably equal to or less than 0.12 mol.

The content of the bivalent metal ion is determined with an ICP emission analyzer ("P-4010", manufactured by Hitachi, Ltd.). Specifically, the cover 6 is taken as a sample from the golf ball 2. A 100 mg piece of the taken cover 6 is used as a sample, and 6 ml of concentrated sulfuric acid is added to the sample. A solution is obtained by extraction from (acid decomposition of) the sample with a microwave decomposition apparatus ("ETHOS", manufactured by Milestone General K.K.), and water is added to the solution so as to have a volume of 250 ml. This solution is used as a measurement sample for ICP analysis. The obtained measurement value is converted into a content X of the bivalent metal included in 100 g of the base polymer, and the content X is divided by the atomic weight of the bivalent metal, thereby obtaining the content of the bivalent metal ion included in 100 g of the base polymer. For the measurement, a slab formed by hot press and having a thickness of about 2 mm may be used. In this case, a slab formed from the same resin composition as the resin composition of the cover 6 is used for the measurement.

In the golf ball 2, injection molding is used for forming the cover 6. The cover 6 is formed by injecting the resin composition into a mold from an injection molding machine.

Figure 2:
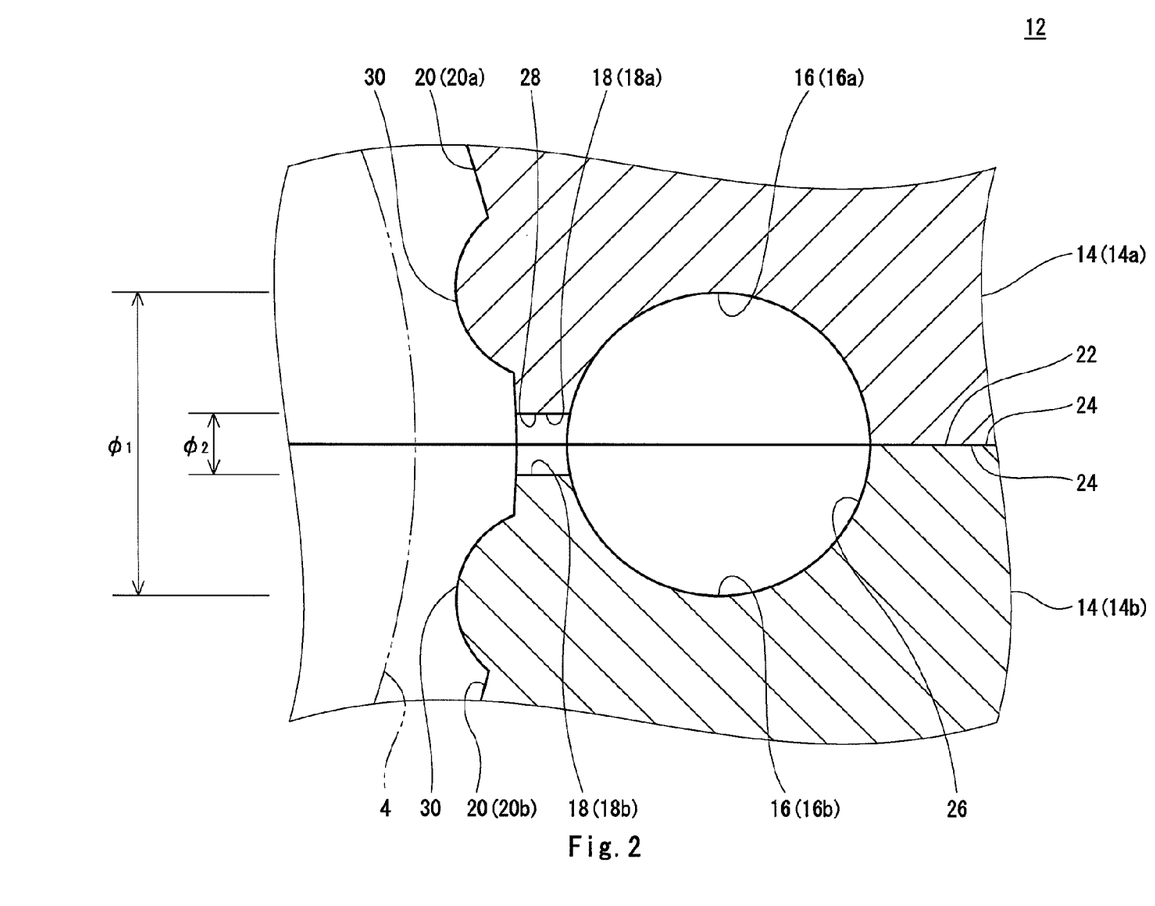
FIG. 2 is a partially enlarged cross-sectional view of a mold used for manufacturing the golf ball in FIG. 1.

FIG. 2 is a partially enlarged cross-sectional view of a mold 12 used for manufacturing the golf ball 2 in FIG. 1. The mold 12 is for injection molding.

The mold 12 consists of a pair of mold halves 14. Each of the mold halves 14 has a deep groove 16, a shallow groove 18, and a cavity face 20 in its face at which the facing mold halves 14 are mated. In the present specification, the mold half 14a positioned on the upper side in FIG. 2 is referred to as an upper mold half. The mold half 14b positioned on the lower side in FIG. 2 is referred to as a lower mold half. The part where the upper mold half 14a is in contact with the lower mold half 14b is a parting line 22. Although not shown in the drawing, the resin composition discharged from the injection molding machine is injected into the mold 12 through a sprue.

The deep groove 16 extends along a mating face 24. In the mold 12, a runner 26 is formed by the upper mold half 14a and the lower mold half 14b being mated such that the deep grooves 16*a* and 16*b* are connected to each other. The mold 12 has the runner 26. As shown in FIG. 2, the runner 26 has a circular cross-sectional shape.

The shallow groove 18 is positioned between the deep groove 16 and the cavity face 20. In the mold 12, a gate 28 is formed by the upper mold half 14*a* and the lower mold half 14*b* being mated such that the shallow grooves 18*a* and 18*b* are connected to each other. The mold 12 has the gate 28. As shown in FIG. 2, the gate 28 has a circular cross-sectional shape. The gate 28 is narrower than the runner 26.

The cavity face 20 has a bowl shape. The cavity face 20 has a large number of pimples 30 thereon. Each of the pimples 30 projects. In the mold 12, a spherical cavity is formed by the upper mold half 14*a* and the lower mold half 14*b* being mated such that the cavity faces 20*a* and 20*b* are connected to each other. The mold 12 has the cavity.

Although not shown in the drawing, the runner 26 extends along the parting line 22 from the sprue toward the cavity in the mold 12. The resin composition injected through the sprue moves through the runner 26 toward the cavity.

The gate 28 is positioned between the runner 26 and the cavity. The resin composition is led to the gate 28 through the runner 26. The resin composition is injected into the cavity through the gate 28.

The core 4 is placed into the cavity. In FIG. 2, what is indicated by the chain double-dashed line is the core 4. When the core 4 is placed into the cavity, a gap is provided between the core 4 and the cavity face 20. The resin composition is injected into the gap through the gate 28. The pimples 30 are transferred on the injected resin to form the dimples 8 thereon.

In FIG. 2, the arrow Ø1 indicates the diameter of the runner 26. The arrow Ø2 indicates the diameter of the gate 28. From the standpoint that the resin composition can be injected into the cavity with excellent flowability maintained, the diameter Ø1 is preferably equal to or greater than 1 mm, more preferably equal to or greater than 1.5 mm, and particularly preferably equal to or greater than 2 mm. The diameter Ø1 is preferably equal to or less than 15 mm, more preferably equal to or less than 12 mm, and particularly preferably equal to or less than 10 mm.

From the standpoint that the resin composition can be injected into the cavity with excellent flowability maintained, the diameter Ø2 is preferably equal to or greater than 0.2 mm, more preferably equal to or greater than 0.3 mm, and particularly preferably equal to or greater than 0.5 mm. The diameter Ø2 is preferably equal to or less than 5 mm, more preferably equal to or less than 4.5 mm, and particularly preferably equal to or less than 4.0 mm.

Figure 3:
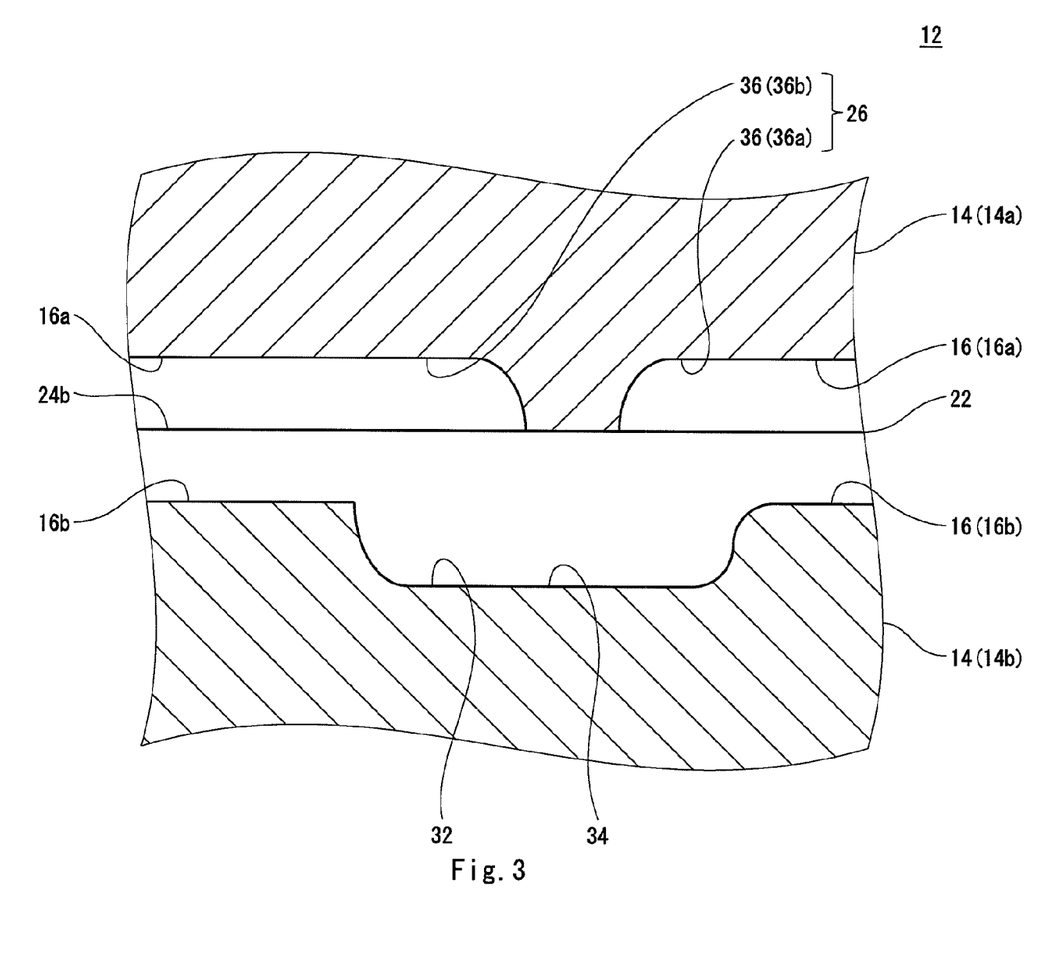
FIG. 3 is a partially enlarged cross-sectional view of the mold in FIG. 2.

FIG. 3 is a partially enlarged cross-sectional view of the mold 12 in FIG. 2. FIG. 3 shows a part of the mold 12 different from that shown in FIG. 2.

The lower mold half 14*b* further has a recess 32. The distance from the mating face 24*b* to the bottom of the recess 32 is longer than the distance from the mating face 24*b* to the bottom of the deep groove 16*b*. The recess 32 is deeper than the deep groove 16.

As shown in FIG. 3, the deep groove 16*a* is divided into two at the part of the upper mold half 14*a* that faces the recess 32. In the mold 12, a melt flipper 34 that divides the runner 26 into two is formed at the recess 32 by the upper mold half 14*a* and the lower mold half 14*b* being mated. In other words, the mold 12 has the melt flipper 34 in addition to the runner 26, the gate 28, and the cavity. The melt flipper 34 is provided between the sprue and the gate 28.

As shown in the drawing, the melt flipper 34 is provided in the middle of the runner 26. The melt flipper divides the runner 26 into two paths 36. The melt flipper 34 connects the paths 36.

In FIG. 3, the right side is the upstream side. The resin composition injected through the sprue moves from right to left. In the mold 12, the resin composition that has passed through the upstream path 36*a* moves to the melt flipper 34. During this movement, the resin composition flows downward. The resin composition that has moved past the melt flipper 34 moves to the downstream path 36*b*. During this movement, the resin composition flows upward. The melt flipper 34 causes the resin composition to flow up and down.

In the part of the mold 12 shown in FIG. 3, the resin composition that flows in the upstream path 36*a* on the upper mold half 14*a* side has a flow rate greater than the flow rate of the resin composition that flows in the upstream path 36*a* on the lower mold half 14*b* side. In the part of the mold 12, the flow of the resin composition flowing in the upstream path 36*a* is disturbed.

As shown in the drawing, the melt flipper 34 is provided in the lower mold half 14*b*. The movement of the resin composition past the melt flipper 34 equalizes the flow rate of the resin composition that flows in the downstream path 36*b* on the upper mold half 14*a* side, with the flow rate of the resin composition that flows in the downstream path 36*b* on the lower mold half 14*b* side. The melt flipper 34 contributes to equalizing the flow rate of the resin composition flowing in the runner 26. When the flow rate of the resin composition that flows in the upstream path 36*a* on the lower mold half 14*b* side is greater than the flow rate of the resin composition that flows in the upstream path 36*a* on the upper mold half 14*a* side, the melt flipper 34 is provided in the upper mold half 14*a*. In this case, a recess is formed in the upper mold half 14*a*, and the deep groove 16*b* is divided into two at the part of the lower mold half 14*b* that faces the recess. In the mold 12, in light of effective balance adjustment of flow rate, an odd number of melt flippers 34 are preferably provided for one cavity.

Although not shown in the drawing, a manufacturing apparatus used for forming the cover 6 includes an injection molding machine, the mold 12, and a cooling unit. The injection molding machine includes a heating unit and an injection unit. The heating unit heats the resin composition. Due to the heating, the resin composition is melted. The injection unit includes a piston and a nozzle. In the injection unit, grooves are cut in the outer circumference of the piston. The injection unit is of a screw type. The injection unit may be of a plunger type in which no groove is provided in the outer circumference of the piston. The injection unit moves the piston forward to apply pressure to the melted resin composition, thereby rapidly injecting the resin composition into the mold 12 through the nozzle. The cooling unit cools the resin composition injected into the mold 12. Examples of the injection molding machine include: a horizontal type injection molding machine that injects a resin composition in the horizontal direction; and a vertical type injection molding machine that injects a resin composition in the vertical direction.

In the injection molding machine, the volume of the resin composition injected per one injection (may be referred to as one shot) is controlled by adjusting the volume of the resin composition injected per unit time and the time taken for injection. The volume of the resin composition injected per unit time is referred to as injection rate V ($cm^3$/sec). In the present invention, the injection rate V is the product of a movement speed (cm/sec) of the piston in injection molding and the cross-sectional area ($cm^2$) of a cylinder filled with the resin composition in the injection molding machine. An injection time T (sec) is the time taken for the above injection. In the present invention, the time until pressure-keeping control is switched to after the injection is started, is defined as the injection time T. The product of the injection rate V and the injection time T is the injection volume per one shot.

The golf ball 2 is manufactured as described below. A rubber composition is obtained by kneading additives such as a co-crosslinking agent and the like with a base rubber. The rubber composition is placed into a mold including upper and lower mold halves each having a hemispherical cavity, and compressed and heated. Due to the compression and heating, a spherical core 4 is obtained. A base polymer and the like are mixed with a twin-screw extruder, and a pellet-form resin composition is prepared. The pellet-form resin composition is fed into the injection molding machine, and a part of the resin composition is heated inside the injection molding machine to be melted. The mold 12 shown in FIGS. 2 and 3 is prepared and adjusted at a predetermined temperature. After the adjustment, the core 4 is placed into the cavity of the mold 12. After the placement, the melted resin composition is injected between the cavity and the core 4 from the nozzle of the injection molding machine at a predetermined injection rate for a predetermined injection time. The resin composition is cooled to form a cover 6. A clear paint is applied to the cover 6 to complete the golf ball 2 shown in FIG. 1.

In the golf ball 2, the molding condition for forming a thin cover 6 is optimized based on the product (M*V*T) of: a melt fluidity M (g/10 min) of the resin composition, which is measured at 190° C.; the injection rate V (cm$^3$/sec); and the injection time T (sec). The product (M*V*T) indicates that use of a low melt fluidity M and a low injection rate V causes extension of the injection time T. A long injection time causes a decrease of the strength of the golf ball 2 at the weld line, and thus the hit durability of the golf ball 2 decreases. The product (M*V*T) indicates that use of a high melt fluidity M and a high injection rate V causes shortening of the injection time T. A short injection time contributes to enhancement of the strength of the golf ball 2 at the weld line, and thus the durability of the golf ball 2 improves. Because the flowability of the resin composition flowing in the mold 12 is maintained, the cover 6 is prevented from being formed with uneven thickness. By using the product (M V T) in a predetermined numerical value range, the balance among the melt fluidity M, the injection rate V, and the injection time T is easily adjusted, and thus a thin cover 6 is formed with uniform thickness. The golf ball 2 obtained thus can have excellent durability and can achieve a long flight distance.

In the golf ball 2, the product (M*V*T) is equal to or greater than 500 and equal to or less than 1000. By setting the product (M*V*T) to be equal to or greater than 500, the resin composition flows in the mold 12 in a desirable manner. Because the resin composition is injected between the core 4 and the cavity without excess and deficiency, the resin composition covers the core 4. The thickness of the cover 6 formed in the golf ball 2 is uniform, and in addition, thin. The golf ball 2 can achieve a long flight distance. Because the strength of the golf ball 2 at the weld line is enhanced and the cover 6 with sufficient characteristics is obtained, the golf ball 2 has excellent durability. In this respect, the product (M*V*T) is preferably equal to or greater than 600 and more preferably equal to or greater than 650. By setting the product (M*V*T) to be equal to or less than 1000, the flowability of the resin composition is appropriately maintained. The resin composition is prevented from being excessively injected. The thickness of the cover 6 formed in the golf ball 2 is uniform, and in addition, thin. The golf ball 2 can achieve a long flight distance. Because the strength of the golf ball 2 at the weld line is enhanced and the cover 6 with sufficient characteristics is obtained, the golf ball 2 has excellent durability. In this respect, the product (M*V*T) is preferably equal to or less than 950 and more preferably equal to or less than 900.

In the golf ball 2, the melt fluidity M is preferably equal to or greater than 15 g/10 min and equal to or less than 100 g/10 min. By setting the melt fluidity M to be equal to or greater than 15 g/10 min, the resin composition can flow in the mold 12 in a desirable manner. The thickness of the cover 6 formed in the golf ball 2 is uniform, and in addition, thin. The golf ball 2 can achieve a long flight distance. Because the strength of the golf ball 2 at the weld line is enhanced and the cover 6 with sufficient characteristics is obtained, the golf ball 2 has excellent durability. In this respect, the melt fluidity M is more preferably equal to or greater than 18 g/10 min and particularly preferably equal to or greater than 20 g/10 min. By setting the melt fluidity M to be equal to or less than 100 g/10 min, the elasticity of the melted resin composition is maintained. The resin composition has excellent processability. The thickness of the cover 6 formed in the golf ball 2 is uniform, and in addition, thin. The golf ball 2 can achieve a long flight distance. Because the strength of the golf ball 2 at the weld line is enhanced and the cover 6 with sufficient characteristics is obtained, the golf ball 2 has excellent durability. Because the pellet-form resin composition with uniform size and shape is obtained, the flowability of the resin composition injected from the injection molding machine is stabilized. In this respect, the melt fluidity M is more preferably equal to or less than 45 g/10 min and particularly preferably equal to or less than 40 g/10 min.

From the standpoint that the injection time is saved and the golf ball 2 with excellent durability is obtained, the injection rate V is preferably equal to or greater than 250 cm$^3$/sec and more preferably equal to or greater than 300 cm$^3$/sec. From the standpoint that the resin composition is filled between the core 4 and the cavity without excess and deficiency and a thin cover 6 is formed with uniform thickness, the injection rate V is preferably equal to or less than 500 cm$^3$/sec and more preferably equal to or less than 450 cm$^3$/sec.

From the standpoint that the resin composition is filled between the core 4 and the cavity without excess and deficiency and a thin cover 6 is formed with uniform thickness, the injection time T is preferably equal to or longer than 0.05 sec, more preferably equal to or longer than 0.06 sec, and particularly preferably equal to or longer than 0.07 sec. The injection time T is preferably equal to or shorter than 0.15 sec, more preferably equal to or shorter than 0.14 sec, and particularly preferably equal to or shorter than 0.13 sec.

EXAMPLES

The following will show the effects of the present invention by means of Examples, but the present invention should not be construed in a limited manner based on the description of these Examples.

Example 1

A rubber composition was obtained by kneading 100 parts by weight of a high-cis polybutadiene (trade name "BR-730", available from JSR Corporation), 25 parts by weight of zinc diacrylate, 10 parts by weight of zinc oxide, an appropriate amount of barium sulfate, 0.5 part by weight of diphenyl disulfide (available from Sumitomo Seika Chemicals Co., Ltd.), and 0.8 part by weight of dicumyl peroxide (available from NOF Corporation). This rubber composition was placed into a mold including upper and lower mold halves each having a hemispherical cavity, and heated at 170° C. for 20 minutes to obtain a core.

A resin composition (b) was obtained by kneading 70 parts by weight of an ionomer resin (A) (trade name "Himilan AM7329", available from Du Pont-MITSUI POLYCHEMICALS Co., Ltd.), 30 parts by weight of a nonionic thermoplastic resin (C) (trade name "NUCREL N1050H", available from Du Pont-MITSUI POLYCHEMICALS Co., Ltd.), and 3 parts by weight of titanium dioxide with a twin-screw kneading extruder. The twin-screw kneading extruder was set to have a screw diameter of 45 mm, a screw rotational speed of 200 rpm, and a screw L/D of 35. The resin composition (b) was extruded so as to have a temperature of 170° C. or higher and 230° C. or lower at the die position of the twin-screw kneading extruder, and cut with a pelletizer to be in the form of a pellet. The resin composition (b) obtained thus had a melt fluidity M of 25 g/10 min. "Himilan AM7329" has a melt fluidity of 10 g/10 min, and "NUCREL N1050H" has a melt fluidity of 500 g/10 min. The core was placed into the cavity of the mold shown in FIGS. 2 and 3. The resin composition (b) was injected between the cavity and the core by injection molding, to from a cover. The injection rate V was 254 cm$^3$/sec. The injection time T was 0.130 sec. The thickness of the formed cover was 1.0 mm. On the cover, a large number of dimples having a shape that is the inverted shape of the pimples were formed. The content of the bivalent metal ion included in 100 g of the base polymer was 0.031 mol. A clear paint including a two-component curing type polyurethane as a base material was applied to this cover to obtain a golf ball of Example 1 with a weight of about 45.4 g.

Examples 2 to 4 and Comparative Examples 1 and 2

Golf balls of Examples 2 to 4 and Comparative Example 1 were obtained in a similar manner as Example 1, except: the injection rate V and the injection time T were changed such that the product (M*V*T) was as shown in the following Table 2; and the thickness of the cover was changed. It is noted that in Comparative Example 2, the cover could not be molded.

Examples 5 to 11 and Comparative Examples 3 to 5

Golf balls of Examples 5 to 11 and Comparative Examples 3 and 5 were obtained in a similar manner as Example 1, except: the resin composition was changed such that the melt fluidity M was as shown in the following Tables 2 and 3; and the injection rate V and the injection time T were changed such that the product (M*V*T) was as shown in the following Tables 2 and 3. The ingredients of the resin compositions used for molding a cover are shown in detail in the following Table 1. The detail of the base polymer used in each resin composition is as follows. It is noted that in Comparative Example 4, the cover could not be molded.

Trade name "Himilan 1555" (ionomer resin (A)), available from Du Pont-MITSUI POLYCHEMICALS Co., Ltd.
melt fluidity: 10 g/10 min
Trade name "Aclyn 295 (Zn)" (ionomer resin (B)), available from Honeywell international Inc.
melt fluidity: 1200 g/10 min
Trade name "Aclyn 201 (Ca)" (ionomer resin (B)), available from Honeywell international Inc.
melt fluidity: 185 g/10 min
Trade name "XNY 85A-10L" (resin (D): low-viscosity urethane product), available from BASF SE
melt fluidity: 16 g/10 min

[Evaluation of Durability]

A driver with a metal head (trade name "XXIO", available from SRI Sports Limited, shaft hardness: S, loft angle: 11°) was attached to a swing machine available from Golf Laboratories, Inc. The machine condition was set to have a head speed of 45 m/sec, and a golf ball was hit. The number of hits required to break the golf ball was counted. The result is shown as an index in the following Tables 2 to 3. A greater index indicates more excellent durability.

[Evaluation of Low-Temperature Durability]

A golf ball was placed into a thermostat bath at −10° C., and maintained for 24 hours. The golf ball was shot with an air gun, and forced to collide with a metal plate. Whether or not the golf ball was broken was confirmed. The speed of the golf ball was 45 m/sec. The evaluation was categorized based on the following criteria.

A: The number of broken golf balls was 0 out of 12
B: The number of broken golf balls was 1 or 2 out of 12
C: The number of broken golf balls was 3 or more out of 12

The results are shown in the following Tables 2 and 3.

[Measurement of Ball Diameter]

A diameter of a golf ball at or near the poles was measured with a dial gauge at one location, and the measurement value is referred to as a pole diameter P. A diameter of the golf ball at or near the seam was measured with the dial gauge at two locations, and the average of these measurement values is referred to as a seam diameter S. The average value for 12 golf balls is shown in the following Tables 2 and 3.

[Measurement of Resilience Coefficient]

An aluminum hollow cylindrical object having a weight of 200 g was forced to collide with a golf ball at a speed of 40 m/sec. The speeds of the hollow cylindrical object before and after the collision and the speed of the golf ball after the collision were measured to calculate the resilience coefficient of the golf ball. The average value of data obtained by 12 measurements is shown as an index in the following Tables 2 and 3.

TABLE 1

| | | Ingredients of Resin Composition | a | b | c | d | e | f | g | h | i | j | k |
|---|---|---|---|---|---|---|---|---|---|---|---|---|---|
| Base polymer | Resin (A) | Himilan 1555 | — | — | — | 20 | — | — | — | — | — | 100 | — |
| | | Himilan AM7329 | 74 | 70 | 70 | 50 | 56 | 50 | 38 | — | 100 | — | — |
| | Resin (B) | Aclyn 295 (Zn) | 20 | — | — | 30 | 44 | 50 | 20 | — | — | — | — |
| | | Aclyn 201 (Ca) | — | — | 30 | — | — | — | — | — | — | — | — |
| | Resin (C) | NUCREL N1050H | 6 | 30 | — | — | — | — | 42 | — | — | — | 100 |
| | Resin (D) | XNY85A-10L | — | — | — | — | — | — | — | 100 | — | — | — |
| | | Behenic acid | — | — | — | — | — | — | — | — | — | 30 | — | — |

TABLE 1-continued

| Ingredients of Resin Composition | a | b | c | d | e | f | g | h | i | j | k |
|---|---|---|---|---|---|---|---|---|---|---|---|
| Titanium dioxide | 3 | 3 | 3 | 3 | 3 | 3 | 3 | 3 | 3 | — | — |
| Melt fluidity [g/min] | 20 | 25 | 25 | 27 | 30 | 35 | 45 | 16 | 105 | 10 | 500 |
| Hardness [Shore D] | 60 | 59 | 60 | 61 | 58 | 56 | 56 | 26 | 58 | 60 | 47 |

TABLE 2

Results of Evaluation

| | | Comp. Ex. 1 | Ex. 1 | Ex. 2 | Ex. 3 | Ex. 4 | Comp. Ex. 2 | Ex. 5 | Ex. 6 |
|---|---|---|---|---|---|---|---|---|---|
| Cover | Resin composition | b | b | b | b | b | b | a | c |
| | Melt fluidity M [g/10 min] | 25 | 25 | 25 | 25 | 25 | 25 | 20 | 25 |
| | Thickness [mm] | 1.2 | 1.0 | 0.8 | 0.5 | 0.3 | 0.1 | 0.8 | 0.8 |
| | Content of bivalent metal ion [mol] | 0.031 | 0.031 | 0.031 | 0.031 | 0.031 | 0.031 | 0.039 | 0.051 |
| Molding condition | Injection rate V [cm³/sec] | 200 | 254 | 337 | 360 | 400 | 500 | 337 | 337 |
| | Injection time T [sec] | 0.160 | 0.130 | 0.090 | 0.090 | 0.080 | — | 0.120 | 0.100 |
| | Product [M * T * V] | 800 | 826 | 758 | 810 | 800 | — | 809 | 843 |
| | Durability | 145 | 139 | 128 | 115 | 100 | — | 130 | 135 |
| | Low-temperature durability | A | A | A | A | A | — | A | A |
| | Pole diameter P [mm] | 42.75 | 42.74 | 42.75 | 42.74 | 42.72 | — | 42.74 | 42.75 |
| | Seam diameter S [mm] | 42.77 | 42.77 | 42.77 | 42.77 | 42.76 | — | 42.77 | 42.78 |
| | Difference (P-S) [mm] | -0.02 | -0.03 | -0.02 | -0.03 | -0.04 | — | -0.03 | -0.03 |
| | Resilience coefficient | 99.8 | 100.4 | 100.9 | 101.4 | 101.8 | — | 101.0 | 100.8 |

TABLE 3

Results of Evaluation

| | | Ex. 7 | Ex. 8 | Ex. 9 | Ex. 10 | Ex. 11 | Comp. Ex. 3 | Comp. Ex. 4 | Comp. Ex. 5 |
|---|---|---|---|---|---|---|---|---|---|
| Cover | Resin composition | d | e | f | g | h | i | j | k |
| | Melt fluidity M [g/10 min] | 27 | 30 | 35 | 45 | 16 | 105 | 10 | 500 |
| | Thickness [mm] | 0.8 | 0.8 | 0.8 | 0.8 | 0.8 | 0.8 | 0.8 | 0.8 |
| | Content of bivalent metal ion [mol] | 0.042 | 0.040 | 0.040 | 0.024 | — | 0.033 | — | — |
| Molding condition | Injection rate V [cm³/sec] | 337 | 337 | 337 | 337 | 337 | 337 | 337 | 337 |
| | Injection time T [sec] | 0.095 | 0.080 | 0.075 | 0.060 | 0.120 | 0.050 | — | 0.010 |
| | Product [M * T * V] | 864 | 809 | 885 | 910 | 647 | 1011 | — | 1685 |
| | Durability | 130 | 132 | 129 | 131 | 200 | 70 | — | 20 |
| | Low-temperature durability | A | A | A | B | A | C | — | C |
| | Pole diameter P [mm] | 42.76 | 42.76 | 42.77 | 42.78 | 42.73 | 42.80 | — | 42.85 |
| | Seam diameter S [mm] | 42.78 | 42.78 | 42.75 | 42.75 | 42.78 | 42.71 | — | 42.69 |
| | Difference (P-S) [mm] | -0.02 | -0.02 | 0.02 | 0.03 | -0.05 | 0.09 | — | 0.16 |
| | Resilience coefficient | 101.2 | 100.8 | 100.9 | 100.2 | 100.0 | 99.3 | — | 98.0 |

As shown in Tables 2 and 3, the golf ball of each Example has excellent durability and excellent low-temperature durability. Because the difference (P-S) between the ball diameter P and the ball diameter S is small, the thin cover is formed with uniform thickness in the golf ball. Because the great resilience coefficient is obtained, the golf ball has excellent resilience performance. From the results of evaluation, advantages of the present invention are clear.

The above description is merely for illustrative examples, and various modifications can be made without departing from the principles of the present invention.

The golf ball according to the present invention can be used for playing golf on a golf course and practicing at a driving range.

What is claimed is:

1. A method for manufacturing a golf ball, the method comprising the steps of:
    obtaining a core;
    preparing a mold having a cavity and placing the core into the cavity;
    providing a resin composition with a melt fluidity M (g/10 min), which is measured at 190° C.;
    setting an injection rate V (cm³/sec) and an injection time T (sec) of an injection molding machine;
    balancing the melt fluidity M, the injection rate V and the injection time T so as to satisfy that the product (M*V*T) of: the melt fluidity M (g/10 min) of the resin composition, which is measured at 190° C.; the injection rate V (cm³/sec) of the injection molding machine; and the injection time T (sec) of the injection molding machine, is equal to or greater than 500 and equal to or less than 1000;
    discharging the resin composition from the injection molding machine; and
    injecting the discharged resin composition between the cavity and the core to faun a cover with a thickness of 0.2 mm or greater and 1.0 mm or less,
    wherein the injection time T is equal to or longer than 0.05 sec and equal to or shorter than 0.15 sec, and the injection rate V is equal to or greater than 250 cm³/sec and equal to or less than 500 cm³/sec.

2. The method according to claim 1, wherein the melt fluidity M of the resin composition is equal to or greater than 15 g/10 min and equal to or less than 100 g/10 min.

3. The method according to claim 1, wherein
the resin composition includes a base polymer,
the base polymer includes an ionomer resin and a carboxyl group-containing resin,
the ionomer resin is the principal component of the base polymer, and
the carboxyl group-containing resin has a melt fluidity, measured at 190° C., of 100 g/10 min or greater.

4. The method according to claim 3, wherein
the ionomer resin includes an α,β-unsaturated carboxylic acid, and
the content of the α,β-unsaturated carboxylic acid is equal to or greater than 2% by weight and equal to or less than 30% by weight.

5. The method according to claim 4, wherein
the ionomer resin further includes a metal ion,
a carboxyl group in the ionomer resin is neutralized with the metal ion, and
the degree of neutralization of the carboxyl groups with the metal ions is equal to or greater than 10 mol % and equal to or less than 90 mol %.

6. The method according to claim 4, wherein
the ionomer resin further includes a monovalent metal ion,
a carboxyl group in the ionomer resin is neutralized with the monovalent metal ion, and
the degree of neutralization of the carboxyl groups with the monovalent metal ions is equal to or greater than 10 mol % and equal to or less than 60 mol %.

7. The method according to claim 4, wherein
the ionomer resin further includes a monovalent metal ion and a bivalent metal ion, and
the ratio of the content of the monovalent metal ion with respect to the content of the bivalent metal ion is equal to or greater than 0.1 and equal to or less than 60.

8. The method according to claim 3, wherein the ionomer resin has a melt viscosity, measured with a flow tester, of 500 Pa·sec or greater and 100000 Pa·sec or less.

9. The method according to claim 3, wherein
the carboxyl group-containing resin includes a metal ion,
a carboxyl group in the carboxyl group-containing resin is neutralized with the metal ion, and
the degree of neutralization of the carboxyl groups with the metal ions is equal to or greater than 10 mol % and equal to or less than 100 mol %.

10. The method according to claim 3, wherein the carboxyl group-containing resin has a melt viscosity, measured with a Brookfield viscometer, of 1 Pa·sec or greater and 10 Pa·sec or less.

11. The method according to claim 3, wherein the weight ratio of the ionomer resin with respect to the carboxyl group-containing resin is equal to or greater than 55/45 and equal to or less than 99/1.

12. The method according to claim 3, wherein
the ionomer resin includes a bivalent metal ion, and
the content of the bivalent metal ions included in 100 g of the base polymer is equal to or greater than 0.020 mol.

13. The method according to claim 1, wherein
the mold consists of a pair of mold halves,
the mold has a runner, a gate, and a cavity that are formed by the mold halves being mated,
the mold is configured such that the resin composition discharged from the injection molding machine is led through the runner to the gate and injected from the gate into the cavity,
the runner has a diameter of 1 mm or greater and 15 mm or less, and
the gate has a diameter of 0.2 mm or greater and 5 mm or less.

14. The method according to claim 13, wherein
the mold further has a melt flipper,
the melt flipper is provided in one of the mold halves constituting the mold,
the runner is divided into two paths by the melt flipper,
the melt flipper connects the paths, and
the mold includes an odd number of the melt flippers provided for the one cavity.

15. The method according to claim 1, wherein the cover has a flexural rigidity of 100 MPa or greater and 450 MPa or less.

16. The method according to claim 1, wherein the cover has a rebound resilience of 40% or greater.

17. The method according to claim 1, wherein the cover has a hardness, measured with a Shore D type spring hardness scale, of 40 or greater and 70 or less.

* * * * *